(12) United States Patent
Okamoto et al.

(10) Patent No.: US 8,908,484 B2
(45) Date of Patent: Dec. 9, 2014

(54) RECORDING/REPRODUCING DEVICE AND OPTICAL DISK LIBRARY DEVICE

(71) Applicant: Hitachi-LG Data Storage, Inc., Tokyo (JP)

(72) Inventors: Tomomi Okamoto, Tokyo (JP); Shinji Fujita, Tokyo (JP); Takakiyo Yasukawa, Tokyo (JP); Masayuki Kobayashi, Tokyo (JP)

(73) Assignee: Hitachi-LG Data Storage, Inc., Tokyo (JP)

( * ) Notice: Subject to any disclaimer, the term of this patent is extended or adjusted under 35 U.S.C. 154(b) by 0 days.

(21) Appl. No.: 14/155,536

(22) Filed: Jan. 15, 2014

(65) Prior Publication Data

US 2014/0211600 A1    Jul. 31, 2014

(30) Foreign Application Priority Data

Jan. 30, 2013    (JP) .................................. 2013-014983

(51) Int. Cl.
*G11B 21/08*    (2006.01)
*G11B 20/18*    (2006.01)

(52) U.S. Cl.
CPC ...................................... *G11B 20/18* (2013.01)
USPC ................... 369/30.06; 369/30.07; 369/30.39

(58) Field of Classification Search
CPC ........... G11B 20/1816; G11B 2220/41; G11B 2020/1869; G11B 2020/2537; G11B 2020/20; G11B 27/329; G11B 17/228; G11B 27/002; G11B 27/36; G11B 7/0945
USPC ............ 369/30.27, 30.01, 30.06, 30.07, 30.3, 369/30.39, 47.16, 47.1, 59.1, 53.15, 53.2, 369/53.21, 53.31, 53.11; 386/248; 711/166, 711/114; 365/218
See application file for complete search history.

(56) References Cited

U.S. PATENT DOCUMENTS

| 8,483,025 | B2 * | 7/2013 | Hirabayashi et al. | 369/47.16 |
| 8,576,675 | B2 * | 11/2013 | Shimoda | 369/30.07 |
| 8,582,400 | B2 * | 11/2013 | Nishida | 369/30.39 |
| 2010/0260021 | A1 | 10/2010 | Ueda et al. | |

FOREIGN PATENT DOCUMENTS

JP    2011-154749 A    8/2011

* cited by examiner

*Primary Examiner* — Ali Neyzari
(74) *Attorney, Agent, or Firm* — Antonelli, Terry, Stout & Kraus, LLP.

(57) ABSTRACT

In a recording/reproducing device for recording and reproducing an optical disk, when performing verify processing of inspecting a quality of recorded data and compare processing of inspecting whether the recorded data can be read without errors, a time is taken because the same area needs to be reproduced two times. The verify processing and the compare processing are performed at one time reproduction. To perform the verify processing and the compare processing simultaneously, a recording quality storage part is provided in the recording/reproducing device, and reproduced data is transmitted to a host controller while storing quality information at the time of reproduction by an instruction of the host controller. The host controller performs the compare processing by comparing transmitted data and data at the time of recording and inspects the recording quality by acquiring the quality information of a reproduced area from the recording/reproducing device at intervals set in advance.

19 Claims, 16 Drawing Sheets

RECORDING/REPRODUCING DEVICE AND OPTICAL DISK LIBRARY DEVICE

BACKGROUND

The present invention relates to a recording/reproducing device that uses an optical disk or an optical disk library device that uses the recording/reproducing device, and especially relates to shortening of a processing time at the time of recording on the optical disk.

In the recording/reproducing device which records and reproduces data on the optical disk, there is a case where verify processing and compare processing are performed in order to secure reliability of recorded data. The verify processing is processing of inspecting a quality of the recorded data, and the compare processing is processing of inspecting whether the data recorded on the optical disk can be read without errors. The verify processing and the compare processing are described in Japanese Unexamined Patent Application Publication No. 2010-267367 and Japanese Unexamined Patent Application Publication No. 2011-154749.

SUMMARY

Problems of verify processing and compare processing in the conventional optical disk will be explained using drawings. FIG. 13 and FIG. 14 are diagrams that explain an operation of an optical disk drive having a function of performing the verify processing on recorded data. Upon reception of a command that directs recording from a host controller 2, an optical disk drive 1 records the data transmitted from the host controller 2 on an optical disk. At this time, the optical disk drive 1 checks that the data is correctly recorded by performing write processing 22 in a fixed capacity unit and subsequently performing the verify processing 23 tracing back to the recorded area, not performing processing of writing data on the optical disk (the write processing). Recording such that the data quality is secured can be performed by performing these write processing 22 and verify processing 23 repeatedly. Generally, since in the optical disk drive, the same optical pickup is used to perform the recording and reproduction, it cannot perform the write processing 22 and the verify processing 23 simultaneously, but repeats the write processing 22 and the verify processing 23 alternately, and therefore a comparable time as in the write processing of writing data on the optical disk becomes necessary in the verify processing 23.

Moreover, operations in the case where the verify processing and the compare processing are performed at the time of recording using the optical disk drive 1 of FIG. 13 will be explained by FIG. 15 and FIG. 16. The compare processing 24 is processing that inspects whether the same data is being able to be reproduced by actually reproducing a portion in which the recording was performed and comparing reproduced data and the data transferred for the recording by the host controller 2. Since it is necessary to reproduce the recorded area in order to perform the compare processing 24, the compare processing 24 will be performed after the write processing 22 and the verify processing 23 are completed. Since it is necessary to reproduce all the recorded areas, a time comparable as the time required in the write processing is needed for the compare processing. Therefore, when the verify processing and the compare processing are performed at the time of recording, about three times the time required for the write processing becomes necessary. For this reason, it had become a problem to shorten a time in recording processing accompanied by the verify processing and the compare processing in the recording/reproducing device that uses the optical disk.

The above-mentioned problems are addressed by an invention described in "What is claimed is".

For example, a recording quality storage part is provided in the recording/reproducing device, and the recording/reproducing device transmits the reproduced data to the host controller while storing quality information at the time of reproduction in the recording quality storage part by an instruction of the host controller. The host controller performs the compare processing by comparing the transmitted data and the data at the time of recording, moreover acquires the quality information of a reproduced area from the recording/reproducing device at intervals set in advance, and inspects the recording quality.

According to an aspect of the present invention, a time of the recording processing accompanied by the verify processing and the compare processing can be shortened in the recording/reproducing device that uses the optical disk,

DETAILED DESCRIPTION

Hereinafter, embodiments of the present invention will be described based on drawings.

First Embodiment

Figure 1:
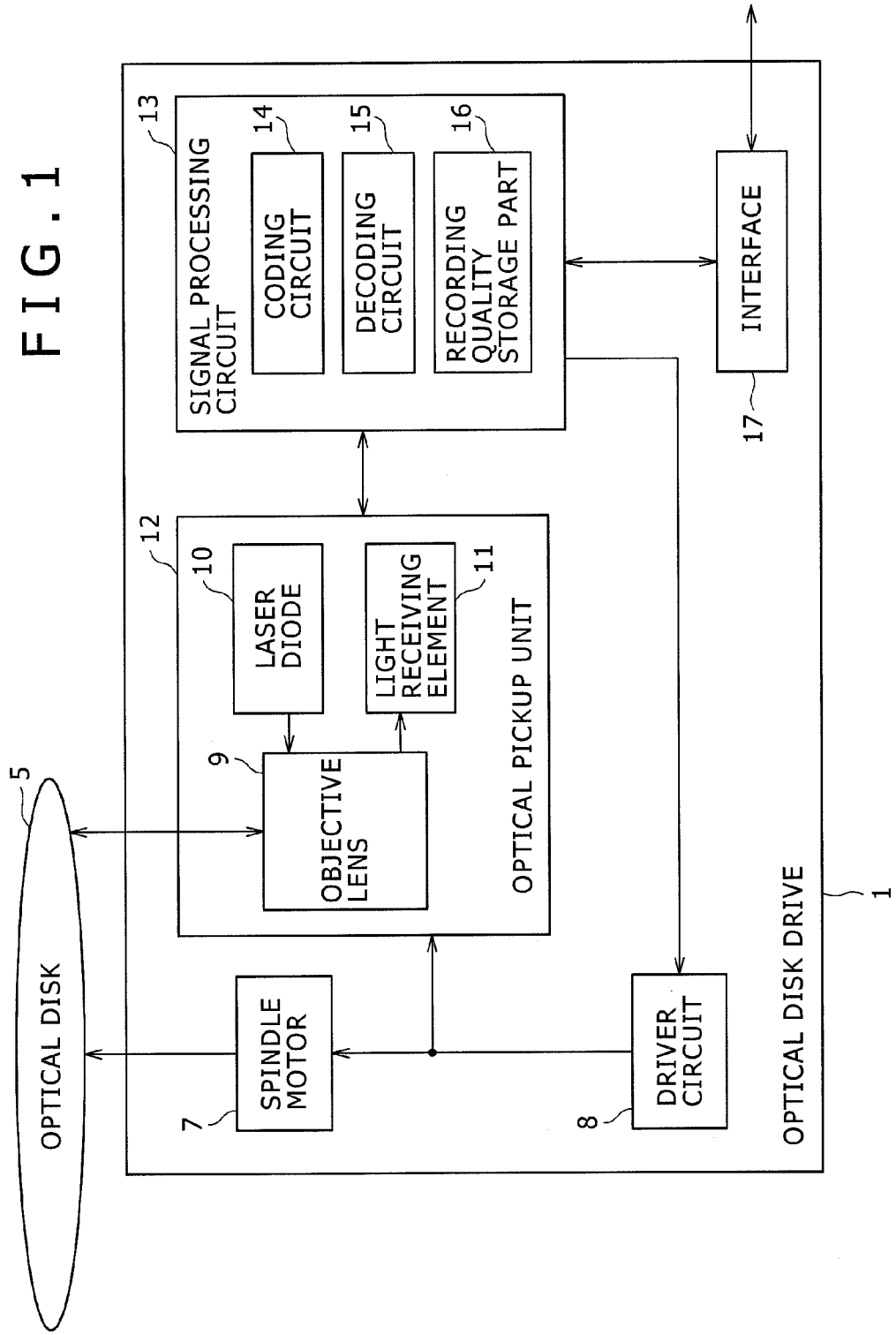
FIG. 1 is a diagram for explaining a first embodiment of the present invention, and is a block diagram of an optical disk drive.

FIG. 1 is a block diagram of an optical disk drive that shows a first embodiment of the present invention. An optical disk 5 is in a state of rotation by a spindle motor 7 and a driver circuit 8. Light emitted from a laser diode 10 mounted on an optical pickup unit 12 is focused onto a data recording surface on the optical disk 5 by an objective lens 9. Then, the light focused onto the optical disk 5 is reflected by the data recording surface, and the reflected light passes through the objective lens 9 again, subsequently enters a light receiving element 11, and is converted into an electric signal. The electric signal outputted from the light receiving element 11 is inputted into a digital processing circuit 13. The digital processing circuit 13 processes the inputted signal, performs communication with an external connection device through an interface 17, performs feedback to the driver circuit 8, and controls the spindle motor 7, the optical pickup unit 12, etc. Moreover, the digital processing circuit 13 has a coding circuit 14 for coding data to be recorded on the optical disk, a decoding circuit 15 for decoding data reproduced from the optical disk, and a recording quality storage part 16 for storing quality information of data acquired at the time of decoding.

Figure 2:
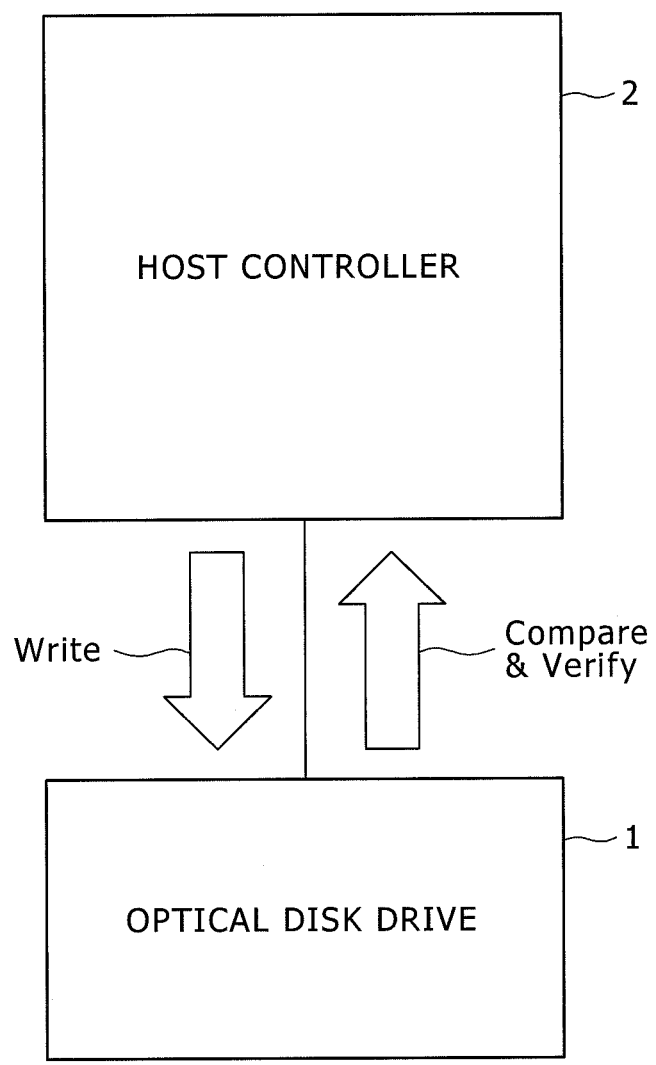
FIG. 2 is a diagram for explaining the first embodiment of the present invention, is a diagram for explaining write processing on the optical disk, compare processing, and verify processing, and is a diagram for explaining that the compare processing and the verify processing are performed by a host controller.
Figure 3:
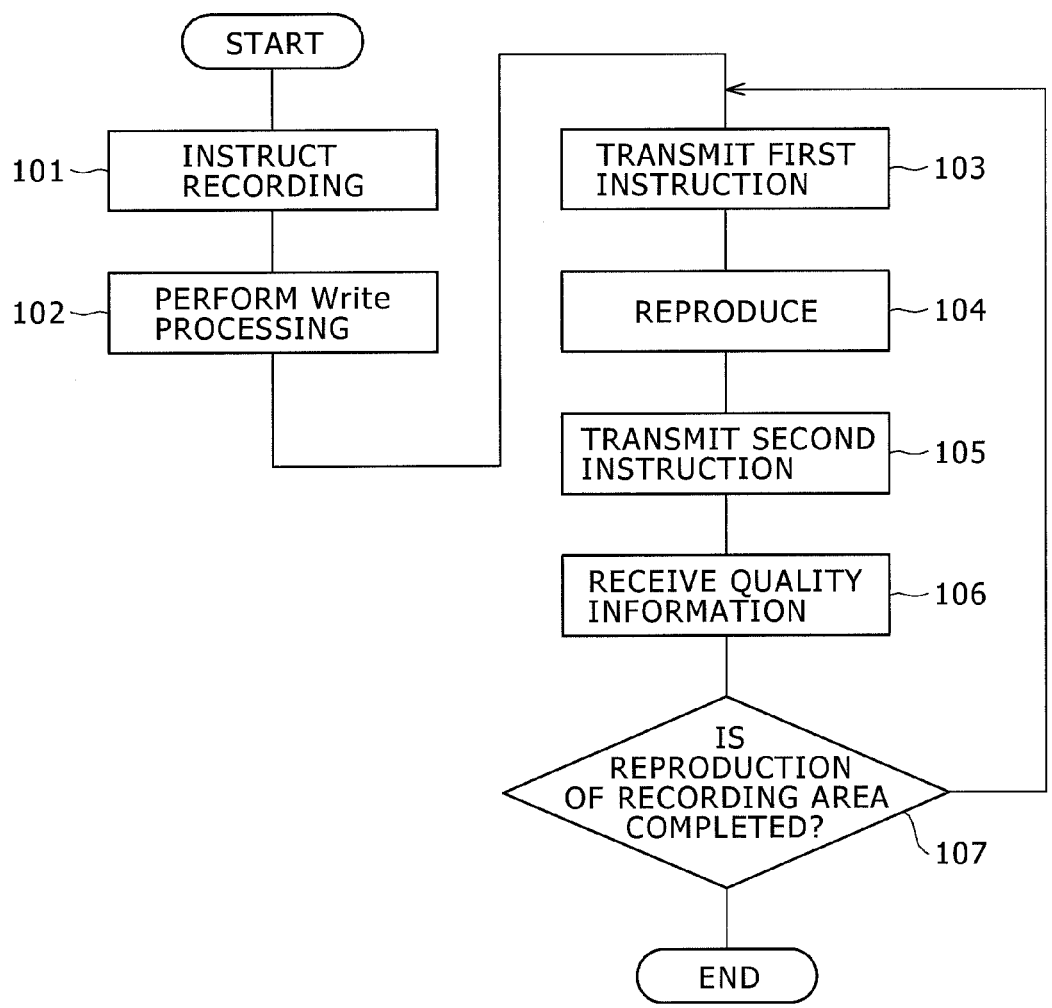
FIG. 3 is a diagram for explaining the first embodiment of the present invention, and is a diagram for explaining a processing flow of the write processing on the optical disk, the compare processing, and the verify processing.
Figure 4:
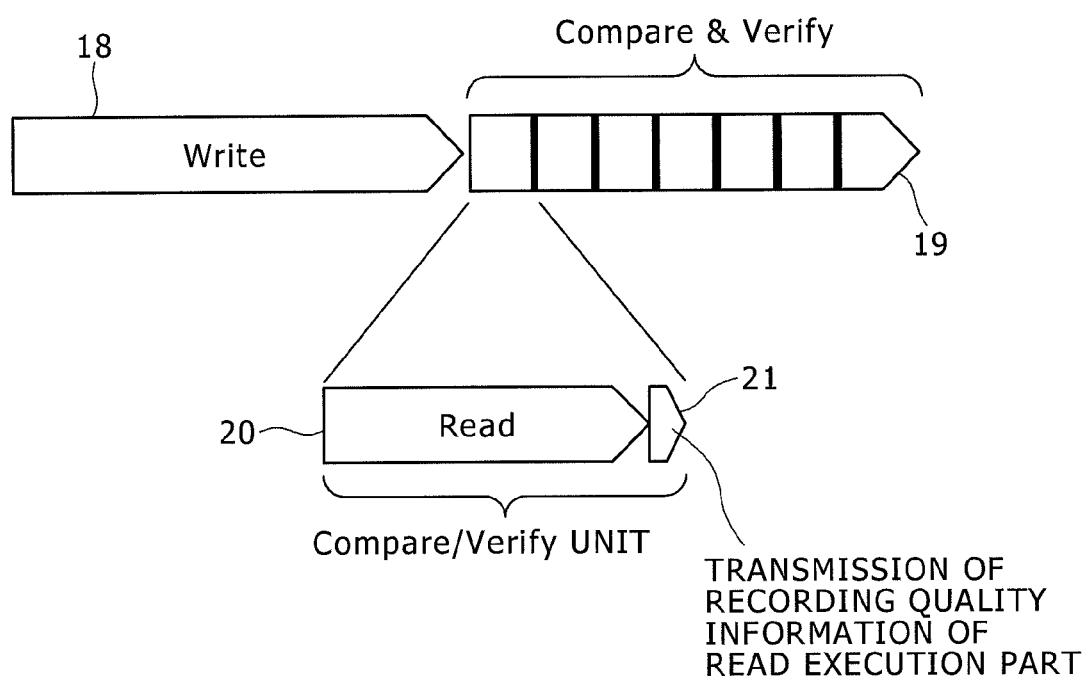
FIG. 4 is a diagram for explaining the first embodiment of the present invention, is a diagram for explaining the write processing on the optical disk, the compare processing, and the verify processing, and is a diagram for explaining a timing at which the write processing, the compare processing, and the verify processing are performed and their processing times.

Recording processing accompanied by verify processing and compare processing in the optical disk drive of the first embodiment will be explained using FIG. 2, FIG. 3, and FIG. 4. FIG. 2 is a diagram for explaining a data flow in each processing between a host controller 2 and an optical disk drive 1, and FIG. 3 is a diagram for explaining a processing flow. Moreover, FIG. 4 is a diagram for explaining an execution timing and a processing time of each processing.

In this embodiment, as shown in FIG. 2, after the data to be recorded was transmitted to the optical disk drive 1 from the host controller 2, reproduced data and the quality information are transmitted to the host controller 2 from the optical disk drive 1 and the verify processing and the compare processing are performed.

The processing at the time of recording is that, as shown in FIG. 3, after the host controller 2 issues a recording instruction to the optical disk drive 1 (101), it transmits the data to be recorded on the optical disk 5 to the optical disk drive 1. The optical disk drive 1 performs write processing of the transmitted data on the optical disk (102). After transmission of the data to be recorded is completed and the write processing in the optical disk drive is completed, the host controller 2 transmits a first instruction for performing the compare processing and the verify processing to the optical disk drive 1 (103). Incidentally, the first instruction is an original command that the drive maker set, and the optical disk drive that does not include this function performs no operation by this command. Upon reception of the first instruction, the optical disk drive 1 reproduces the recorded area (104), and transmits the reproduced data to the host controller 2. Moreover, the optical disk drive 1 stores the data quality information acquired in the decoding at the time of reproduction processing in a recording quality storage part 16. The host controller 2 performs inspection as to whether there is no error in the reproduced data by comparing the data transmitted from the optical disk drive 1 and the data transmitted in order to perform the recording (the compare processing).

Moreover, at a time point when data of a predetermined capacity is reproduced, the host controller 2 transmits a second instruction to the optical disk drive 1 so that the quality information of a reproduced area may be transferred (105). The optical disk drive 1 that received the second instruction transmits the quality information stored in the recording quality storage part 16 to the host controller 2, and the host controller 2 receives this (106). Incidentally, the second instruction is also an original command that the drive maker set, and the optical disk drive that does not include this function performs no operation. Then, the host controller 2 inspects the transmitted quality information by comparing it with a previously decided reference value (the verify processing). The reproduction processing for the compare processing and the verify processing is performed on all the areas in which the write processing has been performed (107), and the recording processing is completed.

In this embodiment, in the recorded area, the compare processing and the verify processing can be performed by one reproduction. Moreover, since a time required for transferring of the quality information is very short as compared with the reproduction time of the optical disk as shown in FIG. 4, it has little effect on processing time. Since conventionally the verify processing and the compare processing were performed separately, the same recorded area was reproduced two times; but in this embodiment, since reproduction of the same recorded area needs to be performed only once, the time required for the compare processing and the verify processing can be reduced to about ½.

Incidentally, in this embodiment, the compare processing is performed by the host controller 2. This is done in order to check that the data being recorded and reproduced on the optical disk can be transferred to the host controller 2 correctly in consideration of data errors other than those caused by the recording and reproduction on the optical disk such as poor communication between the host controller 2 and the optical disk drive 1.

Symbol errors are used as the quality information of the optical disk handled in this embodiment. In the optical disk, errors of the reproduced data can be corrected by adding an error correcting code to each recording unit. The number of errors (the number of symbol errors) that are corrected at this time shall be considered as the quality information whereby the data quality recorded on the optical disk is judged.

When the optical disk has a crack and stain and its recording quality has deteriorated locally, the number of symbol errors also increases locally. In order to detect such degradation, a previously decided area is reproduced and the number of symbol errors that becomes a maximum value in the area is determined, which enables the detection. Moreover, when there is a problem in recording performance of the optical disk drive, the number of symbol errors increases continuously. Such degradation of the recording quality becomes detectable by reproducing a previously decided area and determining an average of the number of symbol errors.

Incidentally, when areas in which the average of the number of symbol errors is acquired is few, if there is a portion in that range where the number of symbol errors is large, the average of the number of symbol errors will become large and it will become impossible to accurately determine the recording performance of the optical disk device. For this reason, it is necessary to decide a proper value as a reproduction capacity for acquiring the quality information. For example, in the optical disk drive of one recording unit of 64 kB, if it is assumed to have a reproduction capacity of transmitting the quality information by every 64 MB, it will become possible to suppress an influence that local degradation in one recording unit exerts on the average of the numbers of symbol errors to about 0.1%.

The recording quality storage part in this embodiment keeps storing the maximum value and the average of the number of symbol errors in the reproduced area. Incidentally, the information of the recording quality storage part is initialized by a reset signal from the host controller, or by an opportunity of transferring the quality information to the host controller, or by an opportunity of receiving an execution instruction of the verify processing and the compare processing, and the maximum value and the average of the number of symbol errors only in the reproduced area are stored in the recording quality storage part.

Incidentally, when performing the write processing, the compare processing, and the verify processing, the compare processing and the verify processing may be performed after all the data for recording is subjected to the write processing as shown in FIG. 3. Alternatively, as shown in FIG. 5, it may be possible to perform the write processing for a predetermined capacity, to perform the compare processing and the verify processing of the area, and to perform repeatedly these write processing, compare processing, and verify processing.

Figure 5:
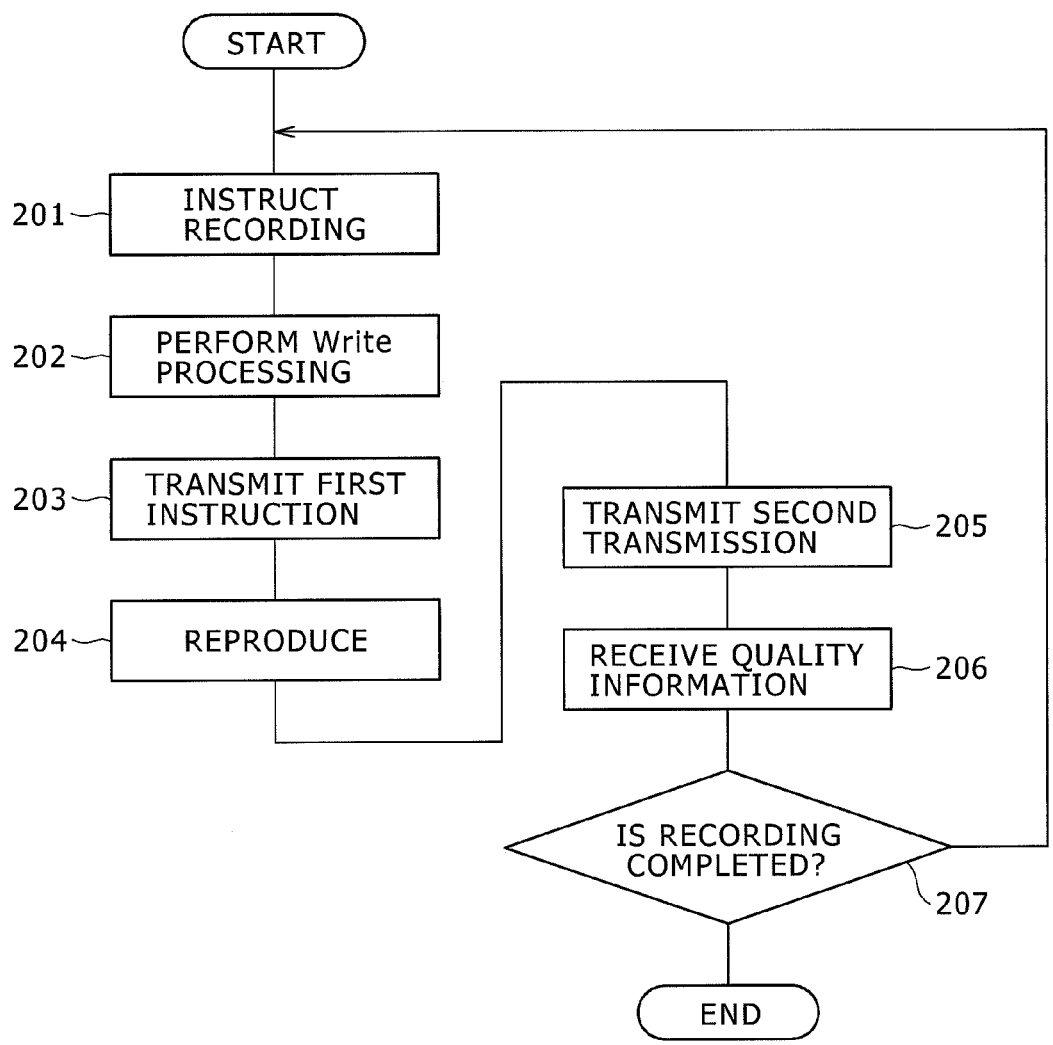
FIG. 5 is a diagram for explaining the first embodiment of the present invention, and is a diagram for explaining the processing flow of the write processing on the optical disk, the compare processing, and the verify processing.

FIG. 5 shows a processing flow in which the recording processing is performed by performing the write processing, the compare processing, and the verify processing with a predetermined capacity and repeating these. In the case of the former, although seek processing does not occur in the middle of the compare processing and the verify processing and a recording time does not increase, a cache capacity for the compare processing in the host controller becomes necessary to be as large as a capacity of one optical disk. Moreover, in the case of the latter, since a portion of the recording data that has gone through the compare processing in the host controller can be released from the cache, reduction of the cache capacity becomes possible, but the seek processing occurs because the write processing, the compare processing, and the verify processing are repeated, and the recording time increases. In the case where the recording time is given a high priority to the optical disk drive, what is necessary is to select the former; in the case where reduction of the cache capacity of the host controller is given a high priority, what is necessary is to select the latter.

Second Embodiment

Figure 6:
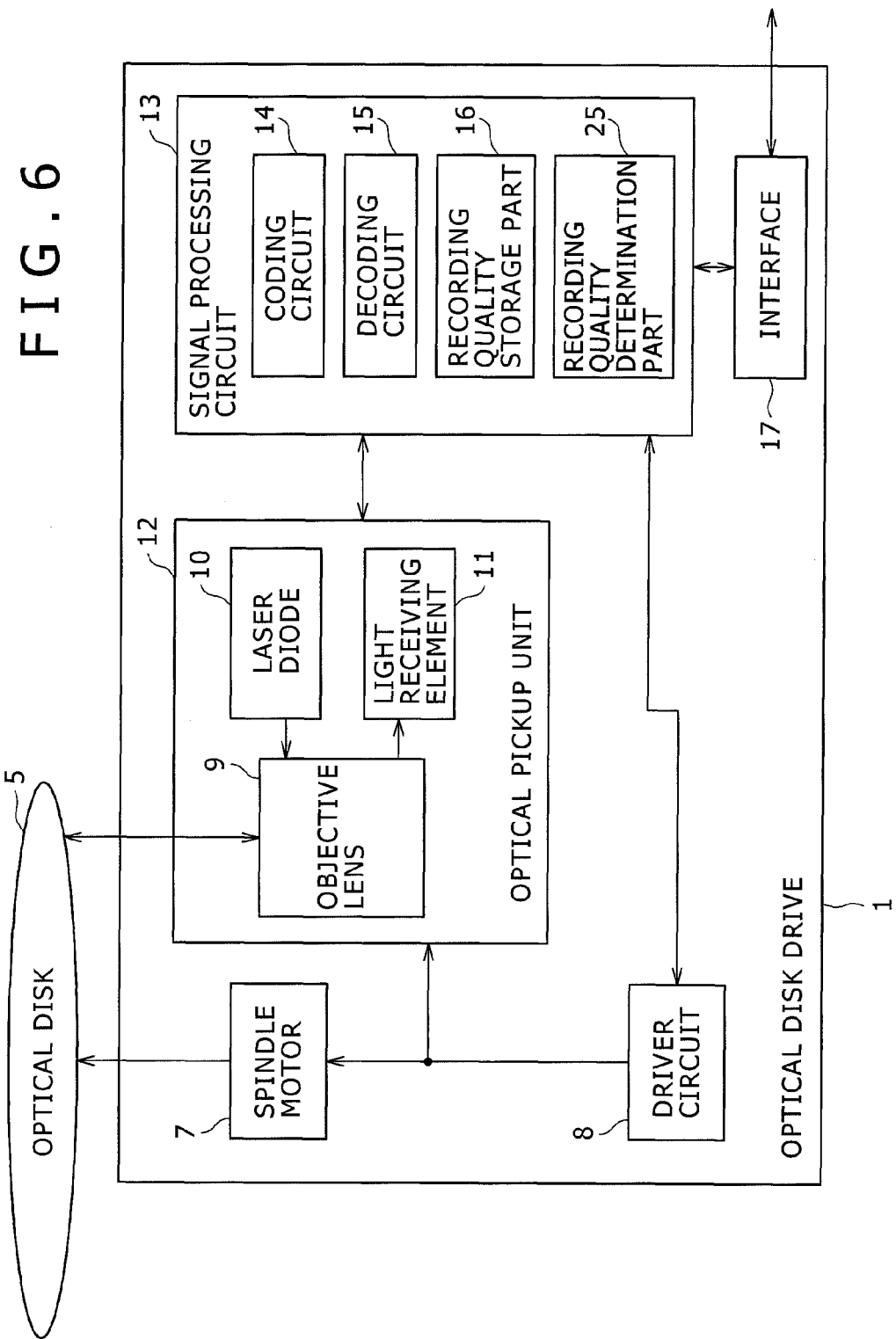
FIG. 6 is a diagram for explaining a second embodiment of the present invention, and is a block diagram of an optical disk drive.
Figure 7:
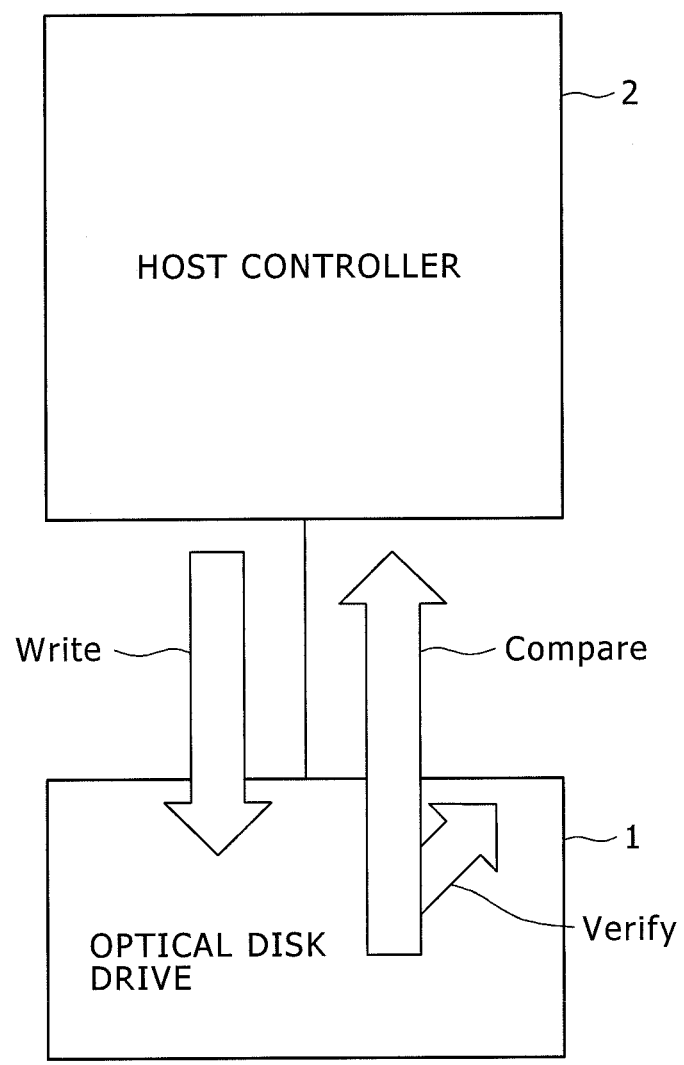
FIG. 7 is a diagram for explaining the second embodiment of the present invention, is a diagram for explaining the write processing on the optical disk, the compare processing, and the verify processing, and is a diagram for explaining that the compare processing is performed by the host controller and the verify processing is performed by the optical disk drive.

Next, a second embodiment of the present invention will be explained using FIG. 6 and FIG. 7. FIG. 6 is a block diagram of the optical disk drive, and FIG. 7 is a diagram for explaining a data flow in each processing of the host controller 2 and the optical disk drive 1. The optical disk drive of the second embodiment has a recording quality determination part 25 in the digital processing circuit 13 in addition to the first optical disk drive. The recording quality determination part 25 determines the quality information stored in the recording quality storage part 16 with a determination value set in advance.

Next, the verify processing and the compare processing in the second embodiment will be explained. After the recording instruction is issued to the optical disk drive 1 from the host controller 2, the data to be recorded on the optical disk 5 is transmitted to the optical disk drive 1. The optical disk drive 1 performs the write processing of the transmitted data on the optical disk. After the transmission of the data to be recorded was completed and the write processing in the optical disk drive was completed, the host controller 2 transmits the first instruction for performing the compare processing and the verify processing to the optical disk drive 1. Incidentally, the first instruction is an original command that a drive maker set, and the optical disk drive that does not include this function performs no operation by this command. Upon reception of the first instruction, the optical disk drive 1 reproduces the recorded area, and transmits the reproduced data to the host controller 2. Moreover, the optical disk drive 1 stores the data quality information acquired in the decoding at the time of reproduction processing in the recording quality storage part 16. The host controller 2 inspects whether the reproduced data is error free by comparing the data transmitted from the optical disk drive 1 and the data transmitted in order to perform the recording (the compare processing). Moreover, the optical disk drive 1 determines the quality information stored in the recording quality storage part 16 in a capacity unit set in advance with the recording quality determination part 25, as shown in FIG. 7 (the verify processing). When the recording quality determination part 25 detected that there is a problem in quality, it transmits a quality information determination result to the host controller 2.

The compare processing needs to be performed by the host controller 2 in consideration of a possibility of errors in a communication channel. However, even when the verify processing that is determination processing of the data quality is performed in the optical disk drive 1, it causes no problem in particular. Moreover, since the determination value of the data quality is a parameter depending on the optical disk drive 1, that determination of the quality is performed by the optical disk drive 1 eliminates necessity for the host controller 2 to have the determination value that depends on a connection device.

Third Embodiment

Figure 8:
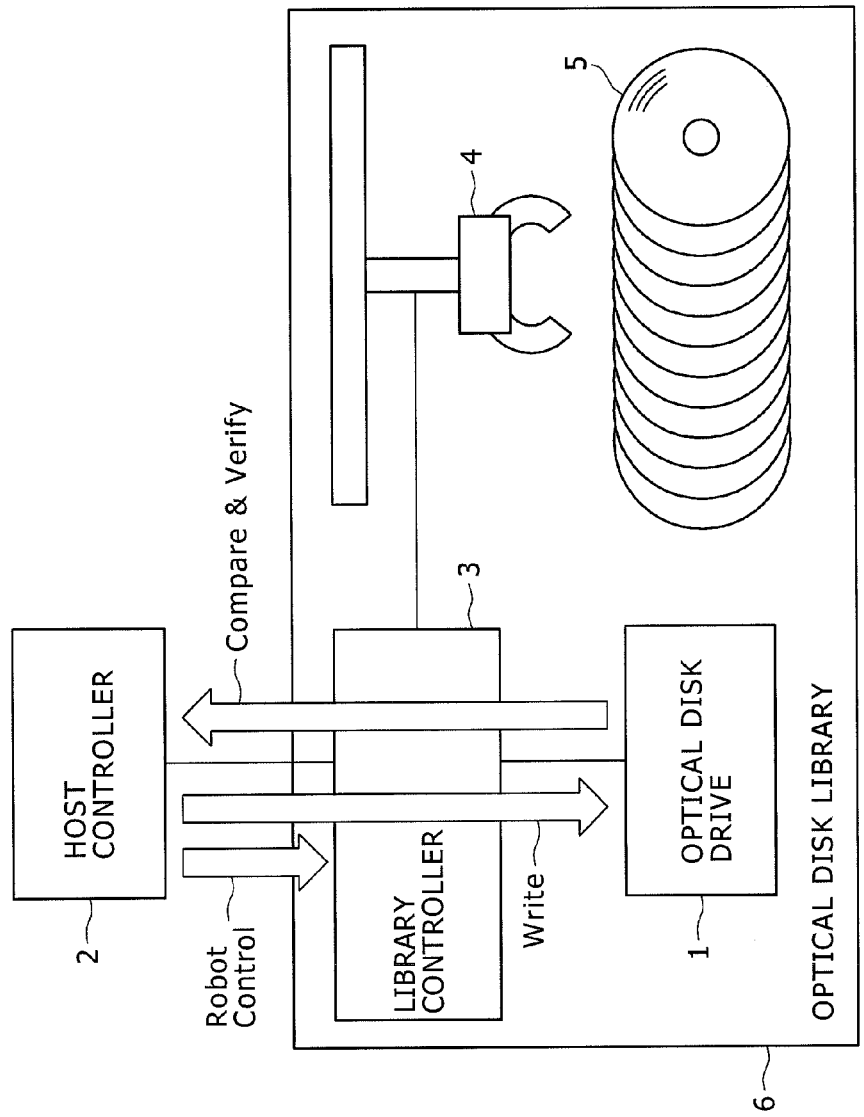
FIG. 8 is a diagram for explaining a third embodiment of the present invention, is a diagram for explaining the write processing, the compare processing, and the verify processing in an optical disk library that houses and uses multiple optical disks, and is a diagram for explaining that the compare processing and the verify processing are performed by the host controller.

Next, a third embodiment of the present invention will be explained using FIG. 8. FIG. 8 shows an optical disk library 6 that mounts the optical disk drive 1 of the first embodiment. The optical disk library 6 carries multiple optical disks 5, conveys an arbitrary optical disk to the optical disk drive 1 by a disk transport mechanism 4 according to an instruction from the host controller 2, and performs the recording or reproduction processing. Moreover, the disk transport mechanism 4 also conveys an optical disk in which the recording or reproduction is completed from the optical disk drive 1 to an optical disk loading position.

Moreover, the optical disk library 6 mounts a library controller 3, and the library controller 3 performs transmission and reception of data with the host controller 2, control of the disk transport mechanism 4, issuance of a command to the optical disk drive 1, etc. Moreover, data transfer between the host controller 2 and the optical disk drive 1 is also performed via the library controller 3. In the optical disk library 6 of this embodiment, when performing the verify processing and the compare processing, the first instruction is transmitted to the optical disk drive 1 like the first embodiment, and the optical disk drive 1 performs transmission of the reproduced data to the host controller 2 and transmission of the quality information by the second instruction via the library controller 3.

Fourth Embodiment

Figure 9:
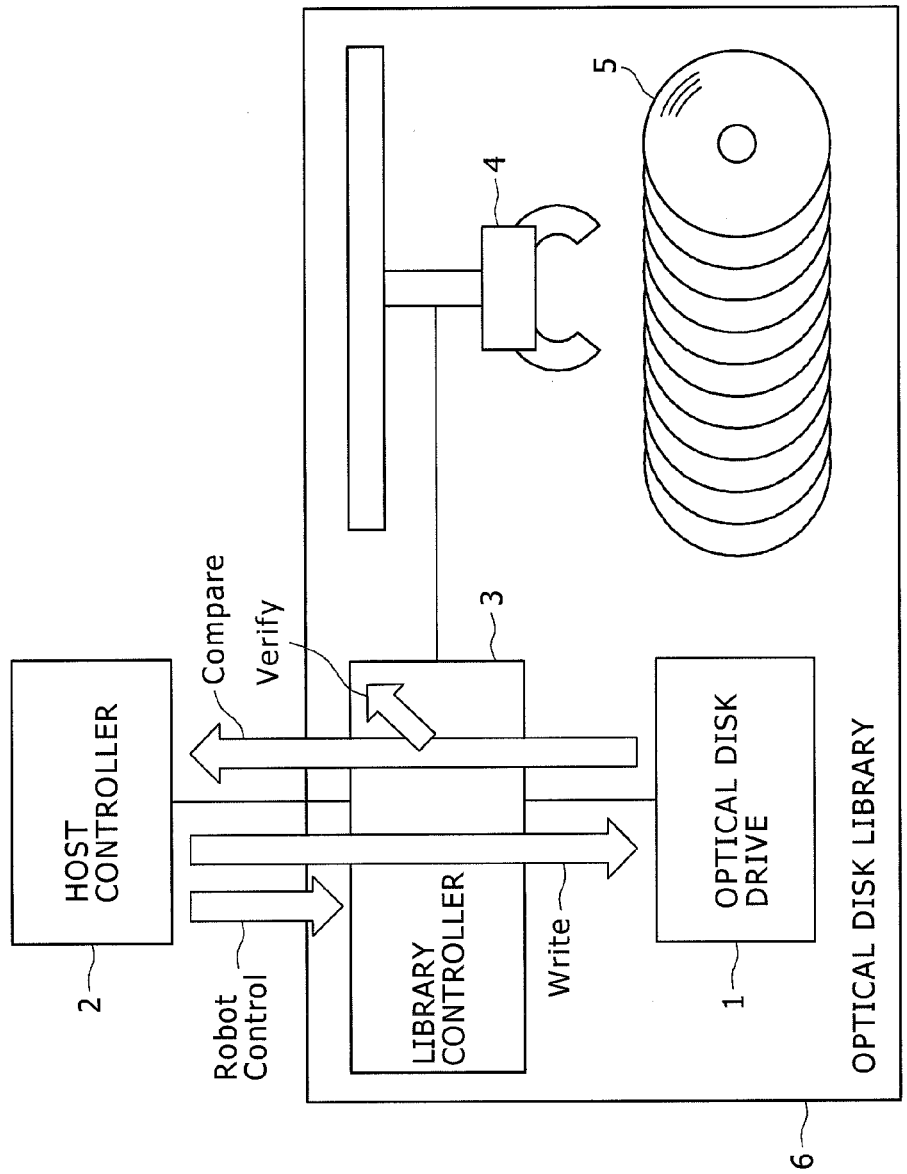
FIG. 9 is a diagram for explaining a fourth embodiment of the present invention, is a diagram for explaining the write processing, the compare processing, and the verify processing in the optical disk library that houses and uses the multiple optical disks, and is a diagram for explaining that the compare processing is performed by the host controller and the verify processing is performed by a library controller.
Figure 10:
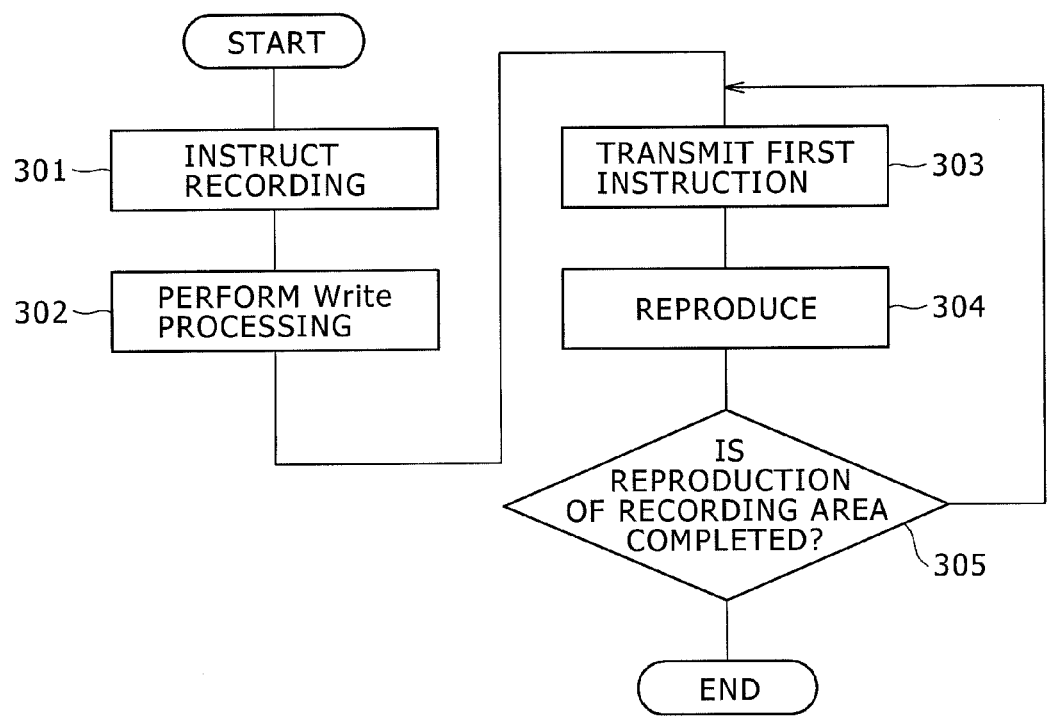
FIG. 10 is a diagram for explaining the fourth embodiment of the present invention, and is a diagram for explaining a processing flow of the host controller.
Figure 11:
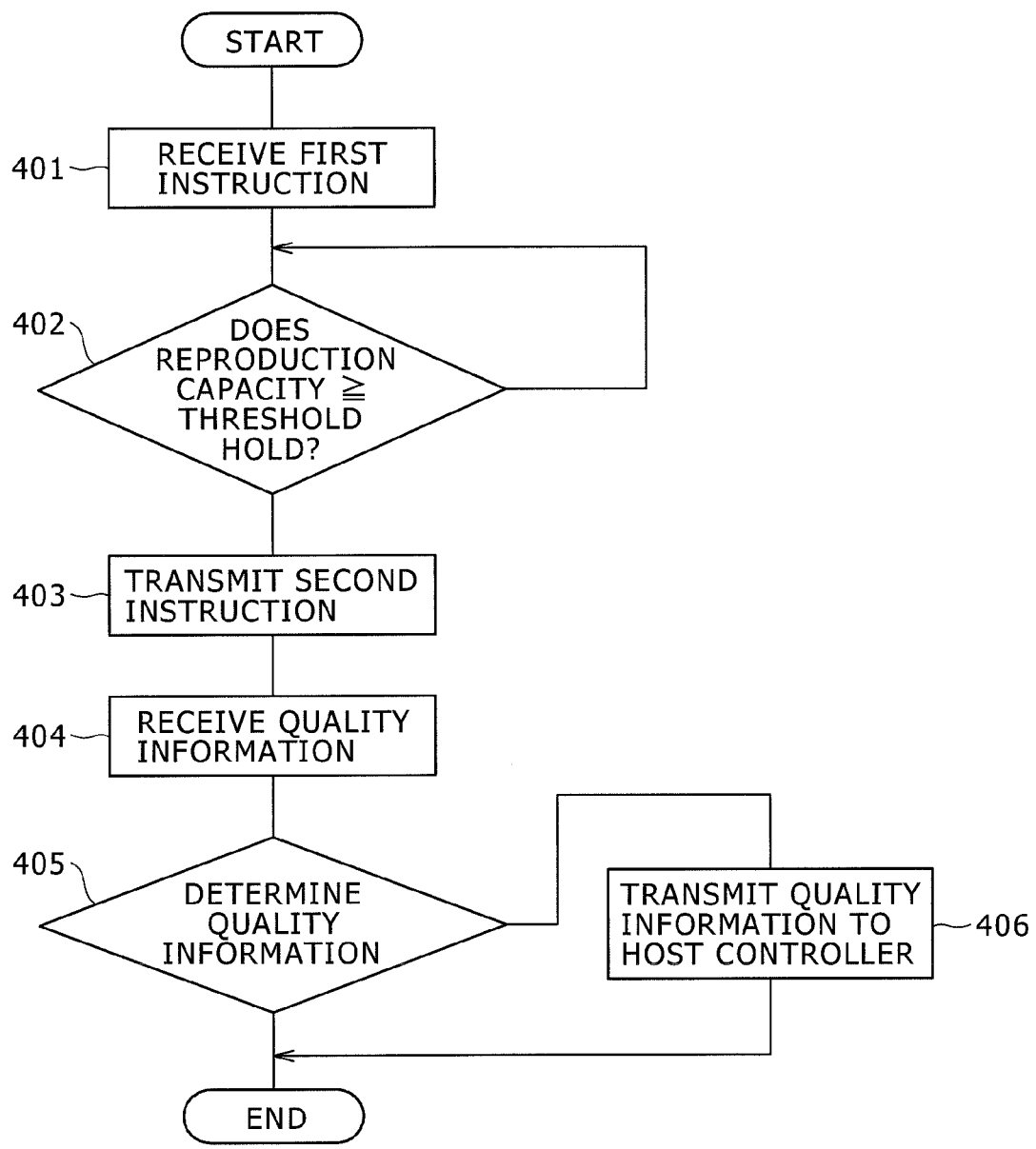
FIG. 11 is a diagram for explaining the fourth embodiment of the present invention, and is a diagram for explaining a processing flow of the library controller.

Next, a fourth embodiment of the present invention will be explained using FIG. 9, FIG. 10, and FIG. 11. FIG. 9 shows the optical disk library 6 that mounts the optical disk drive 1 of the first embodiment. The optical disk library 6 carries multiple optical disks 5, conveys an arbitrary optical disk to the optical disk drive 1 by the disk transport mechanism 4 by an instruction from the host controller 2, and performs the recording or reproduction processing. Moreover, the disk transport mechanism 4 also conveys an optical disk in which the recording or reproduction is completed from the optical disk drive 1 to the optical disk loading position. Moreover, the optical disk library 6 mounts the library controller 3, and the library controller 3 performs transmission and reception of data with the host controller 2, control of the disk transport mechanism 4, issuance of a command to the optical disk drive 1, etc. Moreover, data transfer between the host controller 2 and the optical disk drive 1 is also performed via the library controller 3. Moreover, the library controller 3 mounts a quality information determination part for determining the data quality information recorded by the optical disk drive 1.

The verify processing and the compare processing in this embodiment will be explained by FIG. 10 and FIG. 11. FIG. 10 shows a processing flow of the host controller 2. After the host controller 2 performed the recording instruction to the optical disk drive 1 (301), it transmits the data to be recorded on the optical disk 5 to the optical disk drive 1 via the library controller 3. The optical disk drive 1 performs the write processing of the transmitted data on the optical disk (302). After the transmission of the recording data is completed and the write processing in the optical disk drive is completed, the host controller 2 transmits the first instruction for performing the compare processing and the verify processing to the optical disk drive 1 via the library controller 3 (303). Incidentally, the first instruction is an original command that the drive maker set, and the optical disk drive that does not include this function performs no operation by this command. Upon reception of the first instruction, the optical disk drive 1 reproduces the recorded area (304), and transmits the reproduced data to the host controller 2 via the library controller 3. Moreover, the optical disk drive 1 stores the data quality information acquired in the decoding at the time of reproduction processing in the recording quality storage part 16. The host controller 2 compares the data transmitted from the optical disk drive 1 and the data transmitted in order to perform recording, and performs inspection as to whether there is no error in the reproduced data (the compare processing). The reproduction processing for the compare processing is performed on all the areas in which the write processing was performed (305), and the recording processing is completed.

Next, a processing flow of the library controller 3 will be explained by FIG. 11. Upon reception of the first instruction of the host controller 2 (401), the library controller 3 transmits the first instruction to the optical disk drive 1, and also monitors reproduction capacity in which the optical disk drive 1 transmits the regenerated data to the host controller 2. At a time point when the reproduction capacity exceeds the previously decided threshold (402), the second instruction is issued to the optical disk drive 1 so that the quality information of the reproduced area may be transmitted (403). Incidentally, the second instruction is also an original instruction that the drive maker set, and the optical disk drive that does not include this function performs no operation. The optical disk drive 1 that received the second instruction transmits the quality information to the library controller 3, and the library controller 3 receives this (404). Then, the library controller 3 inspects the received quality information by comparing it with the previously decided reference value (the verify processing) (405). When the recording quality determination part detects that there is a problem in quality, the recording quality determination part transmits the quality information determination result to the host controller 2 (406).

Incidentally, when it is detected that there is a problem in the quality in the verify processing, the library controller 3 may transmit the first instruction to the reproduced area to make it be reproduced and the verify processing again may be performed again. This is an action against a fact that a large number of symbol errors are detected by accidental factors, such as adhesion of foreign matters on the optical disk. Since an increase in the number of symbol errors by the accidental factor is canceled by repeated reproduction, such retry processing becomes effective.

Fifth Embodiment

Figure 12:
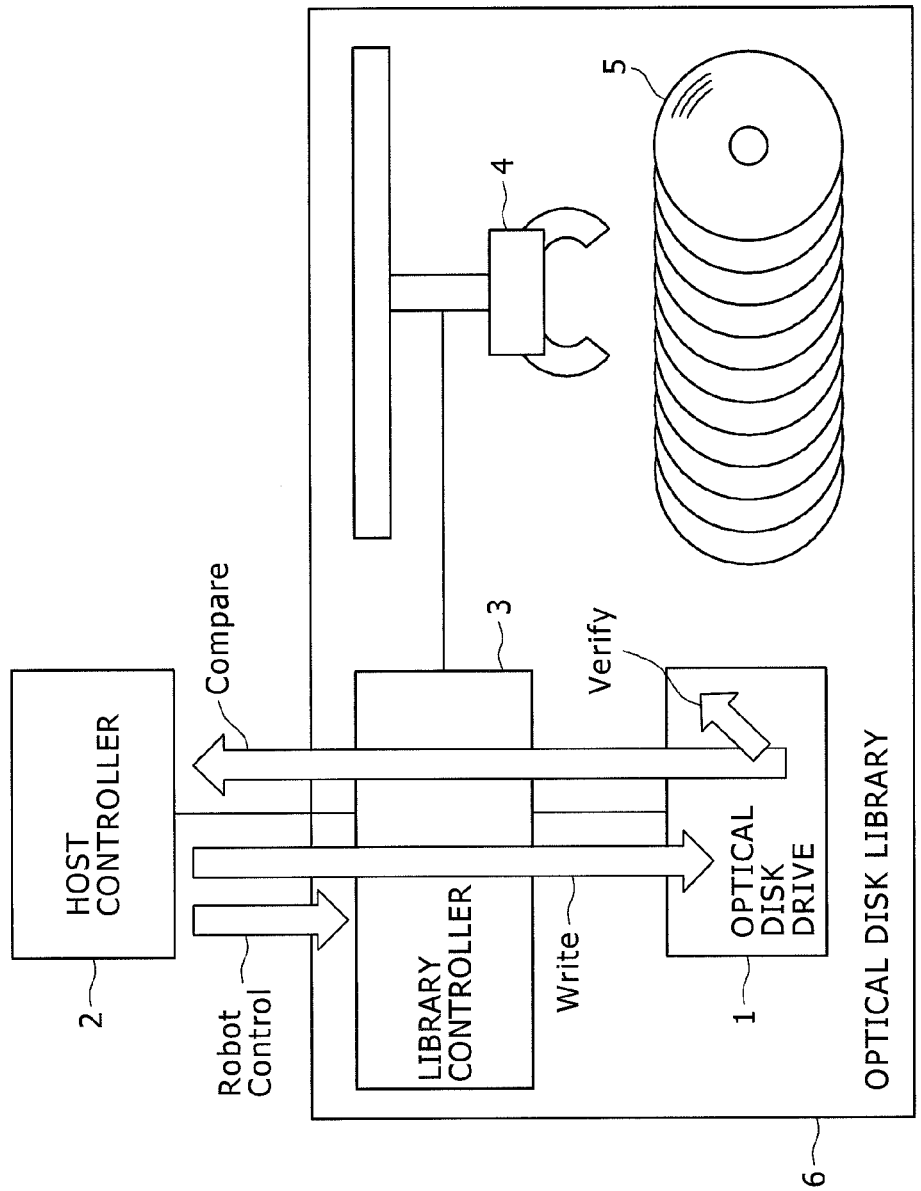
FIG. 12 is a diagram for explaining a fifth embodiment of the present invention, is a diagram for explaining the write processing, the compare processing, and the verify processing in the optical disk library that houses and uses multiple optical disks, and is a diagram for explaining that the compare processing is performed by the host controller and the verify processing is performed by the optical disk drive.
Figure 13:
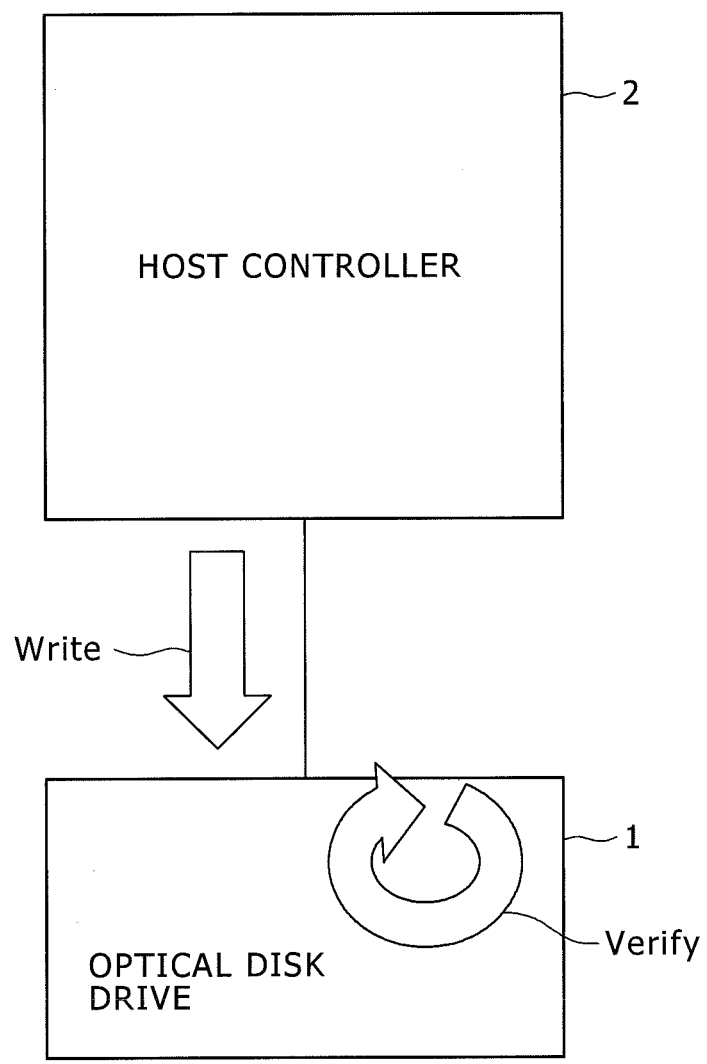
FIG. 13 is a diagram for explaining the write processing and the verify processing on the optical disk in the conventional optical disk drive.
Figure 14:
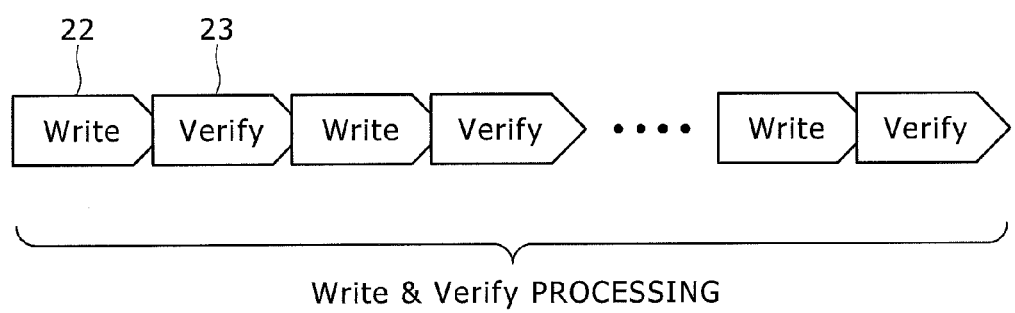
FIG. 14 is a diagram for explaining the write processing and the verify processing on the optical disk in the conventional optical disk drive, and is a diagram for explaining timings at which the write processing and the verify processing are performed and their processing times.
Figure 15:
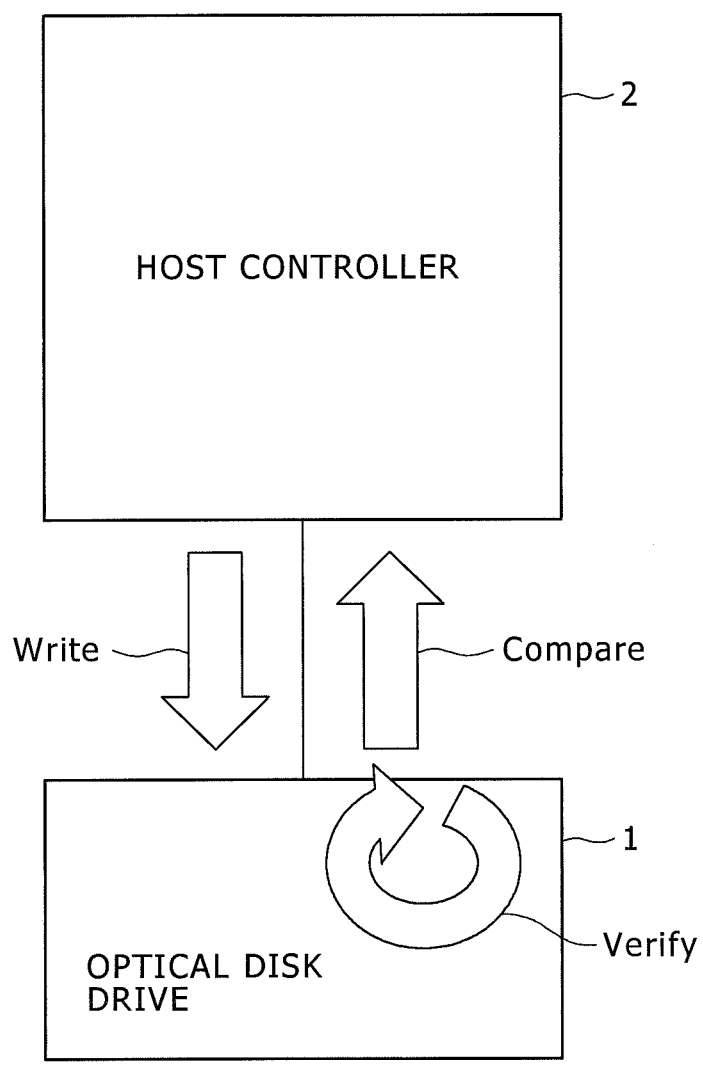
FIG. 15 is a diagram for explaining the write processing, the compare processing, and the verify processing on the optical disk in the conventional optical disk drive.
Figure 16:
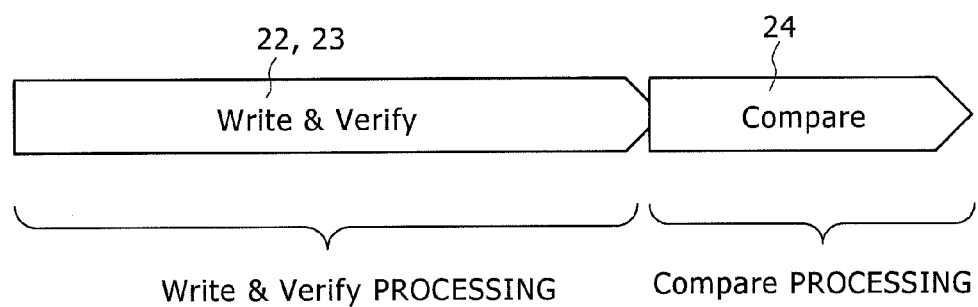
FIG. 16 is a diagram for explaining the write processing, the compare processing, and the verify processing on the optical disk in the conventional optical disk drive, and is a diagram for explaining timings at which the write processing, the verify processing, and the compare processing are performed and their processing times.

Next, a fifth embodiment of the present invention will be explained using FIG. 12. FIG. 12 shows an optical disk library 6 that mounts the optical disk drive 1 of the second embodiment. The optical disk library 6 carries multiple optical disks 5, conveys an arbitrary optical disk to the optical disk drive 1 with the disk transport mechanism 4 by an instruction from the host controller 2, and performs the recording or reproduction processing. Moreover, the disk transport mechanism 4 also conveys the optical disk in which the recording or reproduction is completed from the optical disk drive 1 to the optical disk loading position.

Moreover, the optical disk library 6 mounts the library controller 3, and the library controller 3 performs transmission and reception of data with the host controller 2, control of the disk transport mechanism 4, issuance of a command to the optical disk drive 1, etc. Moreover, data transfer between the host controller 2 and the optical disk drive 1 is performed via the library controller 3. When performing the verify processing and the compare processing in the optical disk library 6 of this embodiment, the first instruction is transmitted to the optical disk drive 1 like the second embodiment, and the optical disk drive 1 transfers the reproduced data to the host controller 2 via the library controller 3.

Incidentally, the first instruction is an original command that the drive maker set, and the optical disk drive that does not include this function performs no operation by this command. Moreover, the optical disk drive 1 performs determination of the quality information, and when there is a problem in the data quality, transmits the determination result to the host controller 2 via the library controller 3. By such processing, even when performing the verify processing and the compare processing, it can be processed at one time reproduction.

Incidentally, also in embodiments following the second embodiment, the maximum value and the average of the number of symbol errors can be used as the quality information. Moreover, a determination index of the data quality should not be limited to the number of symbol errors, and it may be any index that indicates the data quality of the optical disk such as fluctuation (jitter) of the signal other than the number of symbol errors.

What is claimed is:

1. An optical disk library device for carrying a plurality of optical disks and recording and reproducing information on the optical disks, the device comprising:
   a recording/reproducing device that records and reproduces information on the optical disk; and
   a library controller that transmits and receives information to/from the host controller connected to the optical disk library device,
   wherein the recording/reproducing device reproduces an area recorded on the optical disk, includes a recording quality storage part for storing quality information showing a recording state of the area, and when data to be recorded on the optical disk via the library controller is transmitted to the recording/reproducing device from the host controller, the recording/reproducing device records the transmitted data on the optical disk, and
   wherein the recording/reproducing device transmits reproduced data to the host controller via the library controller while storing the quality information at the time of reproduction in the recording quality storage part by a first instruction from the host controller, and transmits the quality information stored in the recording quality storage part to the host controller via the library controller by a second instruction from the host controller.

2. An optical disk library device for carrying a plurality of optical disks and recording and reproducing information on the optical disks, the device comprising:
   a recording/reproducing device that records and reproduces information on the optical disk; and
   a library controller that transmits and receives information to/from the host controller connected to the optical disk library device,
   wherein the recording/reproducing device reproduces an area recorded on the optical disk, and includes a recording quality storage part for storing quality information showing a recording state of the area, and when data to be recorded on the optical disk is transmitted to the recording/reproducing device from the host controller via the library controller, the recording/reproducing device records the transmitted data on the optical disk,
   wherein the recording/reproducing device transmits reproduced data to the host controller via the library controller while storing the quality information at the time of reproduction in the recording quality storage part by a first instruction from the host controller,
   wherein the optical disk library device comprises a recording quality determination part for determining the quality information, and
   wherein the recording quality determination part determines the quality information transmitted from the recording/reproducing device, and when it is judged that the recording quality has not reached a previously decided criterion, transmits a quality information determination result to the host controller.

3. The optical disk library device according to claim 2, wherein a maximum value of the numbers of symbol errors acquired by respective recording units in the reproduced area is considered as the quality information that is stored in the recording quality storage part.

4. The optical disk library device according to claim 2, wherein an average of the numbers of symbol errors acquired by respective recording units in the reproduced area is considered as the quality information that is stored in the recording quality storage part.

5. The optical disk library device according to claim 2, wherein the recording quality determination part determines the quality information by a storage capacity unit set in advance.

6. A recording/reproducing device for recording and reproducing information on an optical disk, the recording/reproducing device reproducing an area recorded on the optical disk, comprising:
   a recording quality storage part that stores quality information showing a recording state of the area,
   wherein when data to be recorded on the optical disk is transmitted to the recording/reproducing device from the host controller connected to the recording/reproducing device, the recording/reproducing device records the transmitted data on the optical disk, and
   wherein the recording/reproducing device transmits reproduced data to the host controller while storing the quality information at the time of reproduction in the recording quality storage part by a first instruction from the host controller, and transmits the quality information stored in the recording quality storage part to the host controller by a second instruction from the host controller.

7. A recording/reproducing device for recording and reproducing information on an optical disk, the recording/reproducing device reproducing an area recorded on the optical disk, comprising:
   a recording quality storage part that stores quality information showing a recording state of the area; and
   a recording quality determination part that determines the quality information,
   wherein when data to be recorded on the optical disk is transmitted to the recording/reproducing device from the host controller connected to the recording/reproducing device, the recording/reproducing device records the transmitted data on the optical disk,
   wherein the recording/reproducing device transmits reproduced data to the host controller while storing the quality information at the time of reproduction in the recording quality storage part by a first instruction from the host controller, and
   wherein the recording quality determination part determines the quality information stored in the recording quality storage part, and when it is judged that the recording quality has not reached a previously decided criterion, transmits a quality information determination result to the host controller.

8. The recording/reproducing device according to claim 6, wherein a maximum value of the numbers of symbol errors acquired by respective recording units in the reproduced area is considered as the quality information that is stored in the recording quality storage part.

9. The recording/reproducing device according to claim 6, wherein an average of the numbers of symbol errors acquired by respective recording units in the reproduced area is considered as the quality information that is stored in the recording quality storage part.

10. The recording/reproducing device according to claim 7, wherein the recording quality determination part determines the quality information by a storage capacity unit set in advance.

11. The optical disk library device according to claim 2, wherein the recording quality determination part is a part of the components of the library controller; and
wherein the recording/reproducing device transmits the quality information stored in the recording quality storage part to the library controller by a second instruction from the library controller.

12. The optical disk library device according to claim 2, wherein the recording quality determination part is a part of the components of the recording/reproducing device; and
wherein the recording quality determination part transmits the recording quality information determination result to the host controller via the library controller.

13. A data archive system comprising:
an optical disk library device for carrying a plurality of optical disks and recording and reproducing information on the optical disks, and
a host controller connected to the optical disk library device;
wherein the optical disk library device further comprises:
a recording/reproducing device that records and reproduces information on the optical disk, and
a library controller that transmits and receives information to/from the host controller;
wherein the recording/reproducing device reproduces an area recorded on the optical disk, and includes a recording quality storage part for storing quality information showing a recording state of the area, and when data to be recorded on the optical disk is transmitted to the recording/reproducing device from the host controller via the library controller, the recording/reproducing device records the transmitted data on the optical disk;
wherein the recording/reproducing device transmits reproduced data to the host controller via the library controller while storing the quality information at the time of reproduction in the recording quality storage part by a first instruction from the host controller;
wherein the data archive system comprises a recording quality determination part for determining the quality information; and
wherein the recording quality determination part determines the quality information transmitted from the recording/reproducing device, and when it is judged that the recording quality has not reached a previously decided criterion, transmits a quality information determination result to the host controller.

14. The data archive system according to claim 13, wherein the recording quality determination part is a part of the components of the host controller; and
wherein the recording/reproducing device transmits the quality information stored in the recording quality storage part to the host controller via the library controller by a second instruction from the host controller.

15. The data archive system according to claim 13, wherein the recording quality determination part is a part of the components of the library controller;
wherein the recording/reproducing device transmits the quality information stored in the recording quality storage part to the library controller by a second instruction from the library controller; and
wherein the recording quality determination part determines the quality information transmitted from the recording/reproducing device, and when it is judged that the recording quality has not reached a previously decided criterion, transmits a quality information determination result to the host controller.

16. The data archive system according to claim 13, wherein the recording quality determination part is a part of the components of the recording/producing device; and
wherein the recording quality determination part determines the quality information, and when it is judged that the recording quality has not reached a previously decided criterion, transmits a quality information determination result to the host controller via the library controller.

17. The data archive system according to claim 13, wherein a maximum value of the numbers of symbol errors acquired by respective recording units in the reproduced area is considered as the quality information that is stored in the recording quality storage part.

18. The data archive system according to claim 13, wherein an average of the numbers of symbol errors acquired by respective recording units in the reproduced area is considered as the quality information that is stored in the recording quality storage part.

19. The data archive system according to claim 13, wherein the recording quality determination part determines the quality information by a storage capacity unit set in advance.

* * * * *